United States Patent [19]
Reno

[11] Patent Number: 4,754,446
[45] Date of Patent: Jun. 28, 1988

[54] OPTICAL RECORDING SYSTEM USING REFRACTED WRITE BEAM FOR ERASING

[75] Inventor: Charles W. Reno, Cherry Hill, N.J.

[73] Assignee: General Electric Company, East Windsor, N.J.

[21] Appl. No.: 6,184

[22] Filed: Jan. 23, 1987

[51] Int. Cl.$^4$ .................. G11B 7/085; G11B 7/125
[52] U.S. Cl. ................................. 369/112; 369/116
[58] Field of Search ..................... 369/100, 44–46, 369/111, 112, 116, 117, 122, 13; 350/287, 484, 6.4, 168; 250/201; 346/76 L, 108

[56] References Cited

U.S. PATENT DOCUMENTS

| | | | |
|---|---|---|---|
| 3,614,448 | 10/1971 | DiPros et al. | 350/202 |
| 3,696,344 | 10/1972 | Feinleib et al. | |
| 3,983,317 | 9/1976 | Glorioso | 369/112 |
| 4,097,895 | 6/1978 | Spong | 346/76 L |
| 4,125,859 | 11/1978 | Oshida et al. | 369/112 |
| 4,275,275 | 6/1981 | Bricot et al. | 369/44 |
| 4,298,974 | 11/1981 | Tsunoda et al. | 369/122 |
| 4,459,690 | 7/1984 | Corsover et al. | 369/44 |
| 4,520,472 | 5/1985 | Reno | 369/112 |
| 4,689,780 | 8/1987 | Ohara et al. | 369/44 |

FOREIGN PATENT DOCUMENTS 57-83347  5/1983  Japan .................................. 369/13

OTHER PUBLICATIONS

Wai-Hon Lee, High Efficiency Multiple Beam Gratings from Applied Optics, Jul. 1, 1979, pp. 2152–2158.

Primary Examiner—Donald McElheny, Jr.
Attorney, Agent, or Firm—Clement A. Berard, Jr.; Christopher Maginniss

[57] ABSTRACT

A multi-beam optical record/playback system includes optical elements for directing pluralities of write and read beams as respective diffraction limited spots on the optically-sensitive surface of a rotating disk. The spots on the disk are positioned such that information can be read immediately after it is written. A prism is selectively interposed in the path of write beams for the purpose or erasing previously recorded information. The prism refracts the write beams, causing a shift of its diffraction limited spots to positions behind the corresponding read spots, thus allowing the read beams to track recorded information which is subsequently erased by the light from the refracted beams.

17 Claims, 3 Drawing Sheets

OPTICAL RECORDING SYSTEM USING REFRACTED WRITE BEAM FOR ERASING

This invention relates generally to optical recording systems and, more particularly, to optical recording systems using erasable media and to an apparatus for transforming the optical recording beam to an erasing beam.

BACKGROUND OF THE INVENTION

High density optical recording systems which may be used for recording and playing back information are known in the prior art. For example, U.S. Pat. No. 4,097,895, entitled "Multi-Layer Optical Record," issued on June 27, 1978, to F. W. Spong, relates to an optical disc record/playback system wherein data are recorded on the surface of a recording medium. In a Spong system the thermal energy of a focused high intensity light beam causes variation in the optical properties on the surface of the recording medium. For example, in one system the thermal effects of a laser beam form pits in an absorptive coating on the surface of an optical disc. In the Spong system, approximately $10^{11}$ bits of information can be recorded on one side of a disc-shaped record medium having a thirty centimeter diameter.

Optical mass data storage systems have developed to the point where they are finding increased application to information processing systems. The advantages of the optical techniques lie in their packing density and the increased data rates with random access retrieval. The potential for improvement in optical data storage will most likely be directed toward the record medium. Although acceptable archival materials for permanent data storage have been developed, research continues to find more efficient techniques and materials to increase packing density, signal-to-noise ratio, and data rates. Nevertheless, in order for optical storage systems to provide total competition for magnetic storage systems, it is necessary to provide an efficient erasable and reusable medium, wherein the erasing procedure is executed in a time period comparable to that required for data recording.

Currently, magneto-optic materials are used in the state-of-the-art recording media to effect readily alterable recordings. A magneto-optic recording medium is a magnetic material which causes the polarization angle of laser light to be changed when reflected from a recorded spot. Preparatory to recording or playback operation, the molecules of the magneto-optic material across the entire recording surface are vertically oriented in one direction. During recording, the molecules of the magneto-optic material at the point of incidence of a laser beam are flipped in the opposite direction due to the presence of a magnetic field of a given strength and polarity and the heating induced by the laser. Illumination from a playback laser beam of lower power reflected from this area will show a polarization angle change. The erasing process then restores the molecular orientation condition which existed prior to recording by the use of a magnetic field of polarity opposite to that used for recording in the presence of a continuous wave laser beam.

Many optical disk storage systems which use the magneto-optic technique have preformatted pilot tracks on the recording surfaces of the disks. That is, each disk has a convolution of permanently recorded information which forms a single spiral track from a point near the outer circumference of the disk to a point near the disk central aperture. The information recorded on this pilot track may typically include data useful in clocking and in determining the track position, e.g., radius and sector. The method by which this information is permanently recorded in the disk surface may typically use an ablative process similar to that described in the Spong patent referenced earlier. With the optical head following the preformatted pilot track under closed loop serve control, data tracks can be recorded on, and played back from, the disc information surface adjacent the pilot track, using a reversible recording process.

There are, however, magneto-optic disk recording systems which use blank, unformatted disk media. The unformatted disk is cheaper, far simpler to fabricate, and offers more flexibility to the user. The unformatted disk does, however, present a tracking problem during erasure. Typically, during the recordation process, the recorded data are checked by a read-after-write process in which the data are read immediately following the write operation. Since data erasure on a magneto-optic disk is substantially the same process as data recordation, data on a preformatted disk may be erased by virtually the same elements used for recording data, while following the pilot track. Since tracking on an unformatted disk is accomplished by reading recorded data, the erasure process on this type of disk requires the ability to read data ahead of the write/erase beam. The effect is to require a system having the capability of reading data following the write beam but preceding the erase beam.

SUMMARY OF THE INVENTION

In accordance with the principles of the present invention, an optical system is disclosed for processing information on a surface of a record medium. The system comprises an optical playback subsystem including a first source of radiant energy, wherein the playback subsystem focuses the radiant energy from the first source on the record medium surface at a first location. The system further comprises an optical record subsystem including a second source of radiant energy, wherein the record subsystem focuses the radiation energy from the second source on the record medium surface adjacent the first location. Finally, the optical system includes means for refracting the radiant energy from the second source, wherein refracting means directs the radiant energy from the second source selectively between a second location on the record medium surface and a third location on the record medium surface, the second and third locations being oppositely positioned with respect to the first location.

DETAILED DESCRIPTION OF THE PREFERRED EMBODIMENT

Figure 1:
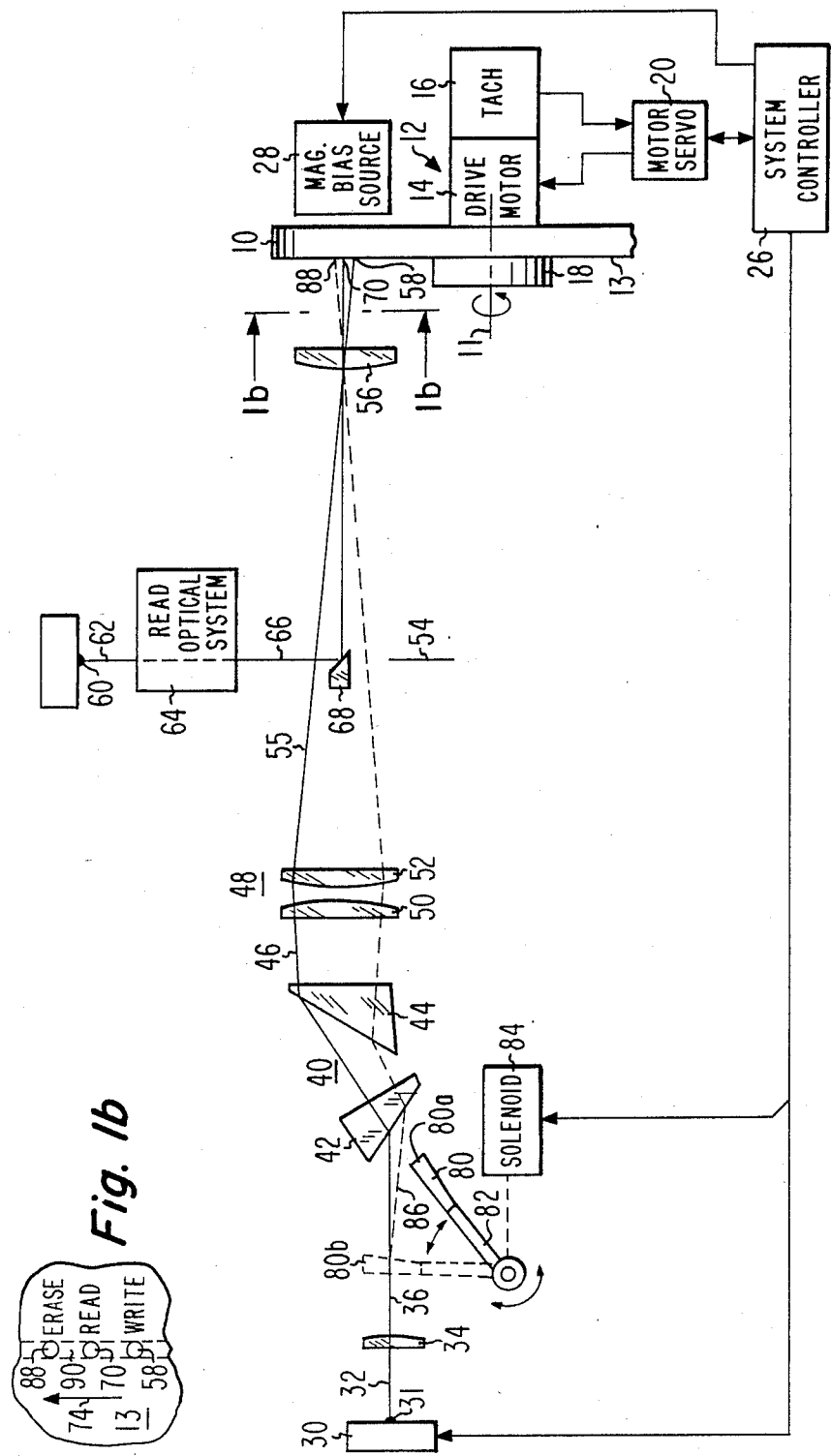
FIGS. 1a and 1b illustrate an optical recording system having read-after-write and read-before-erase capabilities in accordance with the principles of the present invention.

Referring to FIG. 1a, is shown a functional block diagram of the optical information recording and playback system in which the present invention is embodied. In operation, disk 10 is placed on turntable 12 which includes drive motor 14, tachometer 16 and hold-down mechanism 18 by which disk 10 is held in place. Disk 10 may typically comprise an aluminum substrate having a recording surface comprising a magneto-optic coating, such as a 5086-T6 alloy used in Winchester-type disks. After disk 10 is rigidly clamped to turntable 12, drive motor 14 is activated to rotate disk 10 about its central axis 11 at a predetermined angular speed, as measured by tachometer 16. Drive motor 14, which may typically be a brushless dc motor, is controlled by servo system 20 and includes tachometer 16 for the servo loop. Tachometer 16 may typically be an optical tachometer.

In the preferred embodiment of the present invention, the rate at which information is processed by recording on or playing back from the disk is enhanced by techniques of recording and playing back multiple tracks of information simultaneously. Multi-track recording is well known in the art and is described for use with magneto-optic media in U.S. patent application Ser. No. 803,003, filed Nov. 29, 1985, for M. L. Levene et al., and assigned to the same assignee as the present invention. The above-cited reference describes a system which includes a nine-element laser diode array, which may be of the type disclosed in U.S. Pat. No. 4,520,472, issued May 28, 1985, to C. W. Reno.

Light source 30 provides one or more diverging beams of coherent light, which are used for writing information on, and erasing information from, surface 13 of disk 10. Typically, source 30 is a linear array of, illustratively, nine gallium arsenide (GaAs) laser diodes, emitting infra-red light at 8300 Angstroms. The diverging beams, represented in FIG. 1a by the principal ray of a single beam 32 from a single laser diode 31, have a generally elliptical cross-section. Beam 32 is collected into a collimated beam 36 by collection objective lens 34, which may, illustratively, be a plano-objective microscope lens. As an example, lens 34 may have an entrance pupil diameter of 9.945 millimeters and a numerical aperture (NA) of 0.51.

Collimated beam 36 is incident on anamorphic beam expander 40 which, in the present example, comprises two prisms 42 and 44. The refraction of beam 36 through beam expander 40 expands elliptical beam 36 in a plane parallel to the sheet of the figure while leaving the beam unaffected in a plane perpendicular to the sheet. Thus, beam 46 exiting from prism 44 is generally circular in cross-section. Illustratively, the expansion factor of beam expander 40 may be 3.1×.

Beam 46 exiting beam expander 40 from prism 44 is incident on relay optics 48 consisting, in the present example, of a doublet of lenses 50 and 52. Relay doublet 48 may possibly be a singlet if the aberrations of the singlet lens can be tolerated. The relay lens system 48 images the lasing point 31 of array 30 at plane 54, which is the focal plane of lens system 48. The focusing objective lens 56, which is chosen to be a finite conjugate lens, has its finite conjugate plane coincident with the image plane 54. From plane 54, lasing point 31 is imaged as spot 58 on surface 13 of disk record medium 10.

The effect of the relay lens 48 is to image the exit pupil of collection objective lens 34 into the entrance pupil of lens 56, i.e., completely filling lens 56 to form a diffraction limited spot 58 on surface 13. The magnification of the beam may be adjusted by varying the doublet design of relay lens 48. In the present example, the focal point of relay lens 48 in order to fill the entrance pupil of objective lens 56, that is, the rear conjugate of lens 56, is at image plane 54, which is spaced 180 millimeters from both relay lens 48 and objective lens 56.

Light source 60 provides coherent light energy which is used for reading the information stored on surface 13 of disk 10. Typically, source 60 is a single laser diode generating a diverging beam 62 represented in the figure by its principal ray. Beam 62 is directed into an optical system 64 which may include collection, expansion and relaying lenses of a type similar to optics 34, 40 and 46 described earlier. Optical system 64 may further include beam splitting optics such as an optical diffraction grating.

The use of optical diffraction gratings to produce multiple beams from a single input beam is well known and is discussed in U.S. Pat. No. 4,459,690, "MULTI-BEAM OPTICAL RECORD AND PLAYBACK APPARATUS HAVING AN IMPROVED BEAM SPLITTER," issued July 10, 1984, to S. L. Corsover et al. The quantitative aspects of the fabrication of optical gratings for use in beam splitting is discussed in detail in "High Efficiency Multiple Beam Gratings," by Wai-Hon Lee, in Applied Optics, Vol. 18, No. 13, July 1, 1979, pp. 2152-58. Because of its simpler construction and operation, beam splitting is vastly preferable to multiple sources for use in the playback system, since there is no need to individually modulate the playback beams.

Beam 66, which may represent a plurality of light beams issuing from optical system 64, is directed onto mirrored surfaced 68 positioned adjacent write beam 55 in close proximity to focal plane 54. Mirrored surface 68, which may typically be three millimeters in length, reflects beam 66 through focusing objective lens 56, where it images read source 60 on surface 13 of disk 10 as a diffraction limited spot 70, adjacent spot 58, which is the image of the write source 31

Considering FIG. 1b, which provides a plan view of surface 13 of disk 10, it is seen that for motion of disk 10 in the direction indicated by arrow 74, diffraction limited spot 58, the image of write source 31, illuminates a point on surface 13 just prior to diffraction limited spot 70, the image of read source 60. In other words, the relative positioning of spots 58 and 70 provides read-after-write capability for the direction of motion of disk 10 as shown.

In accordance with the principles of the present invention, prism 80 is mounted to the movable arm 82 of rotary solenoid 84 such that it can be selectively positioned in or out of the path of beam 36. In position 80a, prism 80 is entirely clear of beam 36 and produces no refraction thereof. When solenoid 84 is energized to move arm 82 in a counterclockwise direction, prism 80 (shown in position 80b as a dashed line) is positioned so that it refracts beam 36 into beam 86, shown as a dashed line. Beam 86 is anamorphically expanded by beam expander 40, and its lasing point source 31 is imaged at plane 54, filling the entrance pupil of objective lens 56, and is focused as a diffraction limited spot 88 on surface 13 of disk 10. It will be noticed from FIG. ib that spot 88, resulting from the refraction of the light from write source 30 by prism 80, is positioned on the opposite side of read spot 70 on disk track 90 from write spot 58, on surface 13 of disk 10. Thus, for the motion of disk 10 represented by arm 74, diffraction limited spot 88 is effective as an erase spot which follows read spot 80. In the example of FIG. 1a, prism 80 has a face angle on its refractive surface of 6°.

System controller 26 comprises a stored-program processor which may typically be a microprocessor. It provides system control by generating signals to and receiving signals from the several subsystems of the recording/playback system. Controller 26 may typically command servo 20 to activate motor 14, and servo 20 may respond with status signals indicating, for example, servo out-of-lock or overspeed. System controller 26 may typically generate a command to magnetic bias source 28 indicating direction and magnitude of the magnetic field. Controller 26 may provide modulating signals to the lasing elements 31 of diode array 30 when the system is configured for a write operation. Finally, system controller 26 may generate the control signal to rotary solenoid 84 to position prism 80 out of the path of beam 36 during a write operation (position 80a), or in the path of beam 36 during an erase operation (position 80b).

Figure 2:
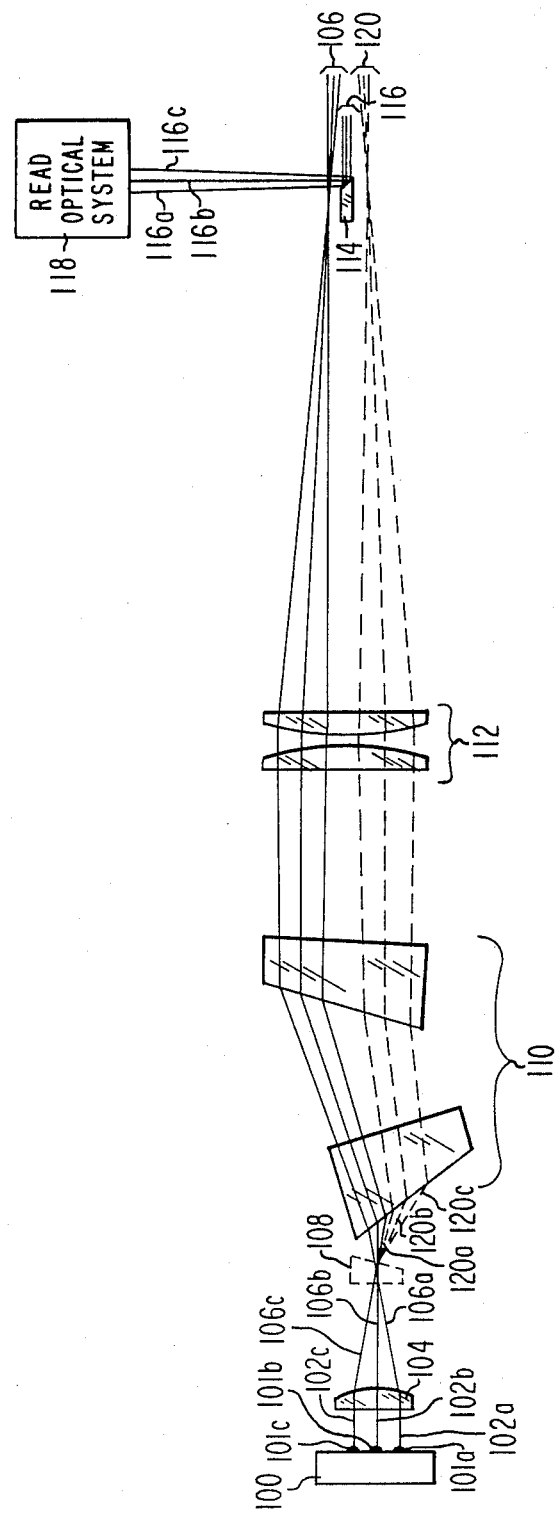
FIG. 2 illustrates a portion of the system of FIG. 1 incorporating multiple beams.

Referring to FIG. 2, there is shown a portion of the system according to the embodiment of FIG. 1a incorporating multiple read and write beams. In this example three sets of beams are shown although, as described earlier, a typical system may include nine beams. Lasing points 101a, 101b and 101c of source 100 emit coherent beams 102a, 102b and 102c, respectively, which are collected by collection objective lens 104 into collimated beams 106a, 106b and 106c, respectively, referred to collectively as beams 106.

In the absence of prism 108, beams 106 are expanded via beam expander 110 to have substantially circular cross sections, and are relayed via relay optics 112 to an optical disk (not shown) where they image lasing points 101a, 101b and 101c as diffraction limited spots for the purpose of writing information on the disk. Mirror 114 directs beams 116a, 116b and 116c emitted from read optical system 118, referred to collectively as beams 116, onto the optical disk as diffraction limited spots for the purpose of reading information recorded on the disk.

With prism 108 in the position shown by dashed lines, beams 106 are refracted (downward, in the figure) as beams 120a, 120b and 120c, referred to collectively as beams 120. Beams 120 are expanded via beam expander 110 to have substantially circular cross sections, and are relayed via relay optics 112 to the optical disk where they image lasing points 101a, 101b and 101c as diffraction limited spots for the purpose of erasing information recorded on the disk. The relative positions of the diffraction limited spots for writing, reading and erasing are as shown in FIG. 1b for a single beam, and as shown in FIG. 4 for multiple beams.

Figure 3:
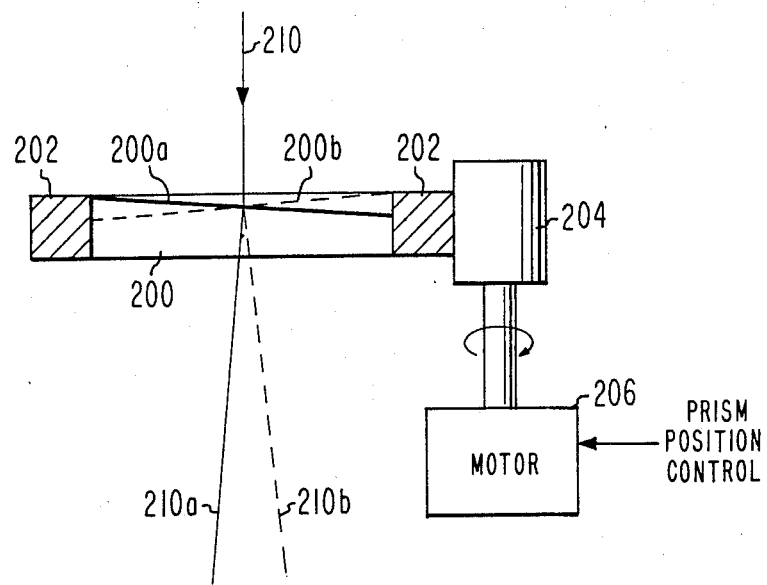
FIG. 3 illustrates an alternate embodiment of the beam refraction apparatus of the system ot FIGS. 1a and 1b.

Referring to FIG. 3, there is shown, partly in cross-section, an alternative embodiment of the write beam refraction apparatus. In this embodiment, prism 200 is generally disk-shaped and may be held by an annular mount 202. Mount 202 may be rotated via frictional contact with drive 204 which is rotated by motor 206 in response to a position control signal. In a first position 200a of prism 200, incoming beam 210, directed along the axis of rotation of prism 200 and mount 202, is refracted to become beam 210a, which may be a write beam. In position 200b (shown by dashed lines), prism 200 refracts beam 210 into beam 210b, which may be an erase beam. Since rotatable prism 200 is always in the path of incoming beam 210 and therefore always refracts it one direction or the other, the angle of its refraction surface may be half of the angle of prism 80 in the apparatus shown in FIG. 1a. That is, if prism 80 has a face angle of 6°, prism 200 in the FIG. 3 apparatus will have a 3° face angle for equivalent refractive effects.

Figure 4:
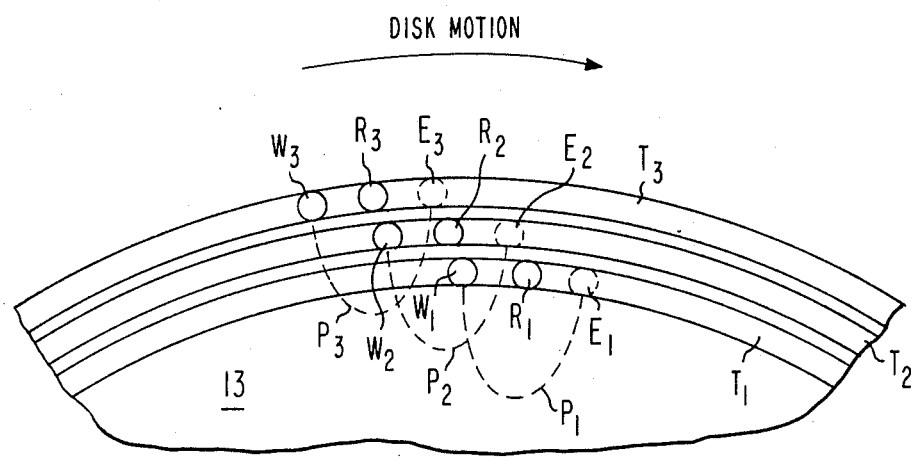
FIG. 4 illustrates the recording surface of a disk medium demonstrating the mation of write beams into erase beams.

Referring to FIG. 4, there is shown a portion of surface 13 of an optical disk for use in multi-track recording. In this illustration there are three circular tracks $T_1$, $T_2$ and $T_3$. Each track has focused on it a diffraction limited spot for reading, $R_1$, $R_2$ and $R_3$, respectively, each positioned, with respect to the disk motion as indicated, just behind a diffraction limited spot for writing, $W_1$, $W_2$ and $W_3$, respectively. Rotation of prism 200 (in FIG. 3) of 180° causes the write spots to traverse elliptical paths $P_1$, $P_2$ and $P_3$, respectively, such that the write spots $W_1$, $W_2$ and $W_3$ become erase spots $E_1$, $E_2$ and $E_3$ on the same respective tracks $T_1$, $T_2$ and $T_3$. For the disk motion as shown, erase spots $E_1$, $E_2$ and $E_3$ follow behind read spots $R_1$, $R_2$ and $R_3$, respectively.

While the principles of the present invention have been demonstrated with particular regard to the illustrated structure of the figures, it will be recognized that various departures from such illustrative structure and method may be undertaken in practice of the invention. As an example, the foregoing description has been directed toward magneto-optic recording systems; nevertheless, the principles of the present invention are equally applicable to any recording medium which is erasable at a single pass. The scope of this invention is therefore not intended to be limited to the structure disclosed herein but should instead be gauged by the breadth of the claims which follow.

What is claimed is:

1. An optical system for processing information on the surface of a record medium, said system comprising:
    an optical playback subsystem including a first source of radiant energy, said playback subsystem focusing the radiant energy from said first source on said record medium surface at a first location;
    an optical record subsystem including a second source of radiant energy, said record subsystem focusing the radiant energy from said second source on said record medium surface adjacent said first location; and
    means for refracting the radiant energy from said second source, said refracting means directing said radiant energy from said second source selectively between a second location on said record medium surface and a third location on said record medium surface, said second and third locations being oppositely positioned with respect to said first location.

2. The system according to claim 1 wherein said refracting means includes a prism.

3. The system according to claim 2 wherein said refracting means further includes means for altering the position of said prism with respect to said radiant energy from said second source.

4. The system according to claim 3 wherein said position altering means includes a rotary solenoid, said solenoid being responsive to a control signal for selectively positioning said prism in the path of, and out of the path of, said radiant energy from said second source.

5. The system according to claim 3 wherein said position altering means includes means for rotating said prism about an axis coincident with the path of said radiant energy from said second source, said rotating means being responsive to a control signal for selectively rotating said prism between a first position and a second position, said second position being displaced from said first position by 180°.

6. The system according to claim 1 wherein said second source of radiant energy emits a plurality of beams of coherent light 7. The system according to claim 6 wherein said optical record subsystem includes means for collecting said plurality of beams into a plurality of collimated beams.

8. The system according to claim 7 wherein said optical record subsystem includes means for expanding said plurality of collimated beams into a plurality of beams having substantially circular cross-sections.

9. An optical system for processing information on a disk-shaped record medium, said record medium having a surface for recording information thereon, said system comprising:

drive means for rotating said record medium about a central axis thereof normal to said surface;

an optical playback subsystem including a first source of light energy, said playback subsystem focusing the light emitted from said first source on said record medium surface at a first location;

an optical record subsystem including a second source of light energy, said record subsystem focusing the light emitted from said second source on said record medium surface adjacent said first location;

means for refracting the light emitted from said second source, said refracting means directing said light emitted from said second source selectively between a second location on said record medium surface and a third location on said record medium surface, said second and third locations being oppositely positioned with respect to said first location; and means coupled to said refracting means for controlling the direction of refraction of the light emitted from said second source.

10. The system according to claim 9 wherein said refracting means includes a prism.

11. The system according to claim 10 wherein said refracting means further includes means for altering the position of said prism with respect to the light emitted from said second source.

12. The system according to claim 11 wherein said position altering means includes a rotary solenoid, said solenoid being responsive to said controlling means for selectively positioning said prism in the path of, and out of the path of, the light emitted from said second source.

13. The system according to claim 11 wherein said position altering means includes means for rotating said prism about an axis coincident with the path of the light emitted from said second source, said rotating means being responsive to said controlling means for selectively rotating said prism between a first position and a second position, said second position being displaced from said first position by 180°.

14. The system according to claim 9 wherein said second source of light energy emits a plurality of beams of coherent light.

15. The system according to claim 14 wherein said optical record subsystem includes means for collecting said plurality of beams into a plurality of collimated beams.

16. The system according to claim 15 wherein said optical record subsystem includes means for expanding said plurality of collimated beams into a plurality of beams having substantially circular cross-sections.

17. The system according to claim 9 wherein said surface of said record medium includes a coating of a magneto-optic substance for effecting erasable recordings thereon.

* * * * *